(12) United States Patent
Witt et al.

(10) Patent No.: US 6,367,257 B1
(45) Date of Patent: Apr. 9, 2002

(54) INSTALLATION FOR PRODUCING SOLAR THERMAL ENERGY

(75) Inventors: Michael T. Witt, Eschenweg 6, D-76275 Ettlingen; Ilse Witt; Janine Witt, both of Ettlingen, all of (DE)

(73) Assignee: Michael T. Witt, Ettlingen (DE)

( * ) Notice: Subject to any disclaimer, the term of this patent is extended or adjusted under 35 U.S.C. 154(b) by 0 days.

(21) Appl. No.: 09/763,390

(22) PCT Filed: Aug. 6, 1999

(86) PCT No.: PCT/EP99/05687

§ 371 Date: Feb. 21, 2001

§ 102(e) Date: Feb. 21, 2001

(87) PCT Pub. No.: WO00/11416

PCT Pub. Date: Mar. 2, 2000

(30) Foreign Application Priority Data

Aug. 25, 1998 (DE) .......................................... 198 38 481

(51) Int. Cl.$^7$ .............................................. B60K 16/00
(52) U.S. Cl. .................... 60/641.15; 60/641.8; 60/641.9
(58) Field of Search .......................... 60/641.8, 641.13, 60/641.15, 641.9

(56) References Cited

U.S. PATENT DOCUMENTS

| | | | |
|---|---|---|---|
| 4,159,629 A | * 7/1979 | Korr et al. ................ | 60/641.15 |
| 4,159,736 A | 7/1979 | Denis et al. | |
| 4,172,766 A | 10/1979 | Laing et al. | |
| 4,235,221 A | * 11/1980 | Murphy ................ | 60/641.15 X |
| 4,294,311 A | 10/1981 | Denis et al. | |
| 4,350,143 A | 9/1982 | Laing et al. | |
| 4,470,403 A | 9/1984 | Lin | |
| 5,005,360 A | * 4/1991 | McMurtry ........... | 60/641.15 X |

FOREIGN PATENT DOCUMENTS

| | | |
|---|---|---|
| DE | 2657244 A1 | 7/1977 |
| DE | 2819946 A1 | 12/1978 |
| DE | 3011986 A1 | 10/1980 |
| DE | 2543687 C2 | 10/1987 |
| DE | 3618551 A1 | 12/1987 |
| DE | 29603275 U1 | 5/1996 |
| FR | 2315067 A | 1/1977 |

* cited by examiner

*Primary Examiner*—Hoang Nguyen
(74) *Attorney, Agent, or Firm*—Gardere Wynne Sewell LLP

(57) ABSTRACT

An installation for producing solar thermal energy includes a floating thermal storage water heater provided with an absorber layer on the inside thereof and with transparent thermal insulation on the upper surface thereof. Solar rays penetrate the transparent thermal insulation and are converted into heat in the absorber layer. Heat is used to warm the water in the thermal storage water heater. The heated water can be removed in the form of a heat-carrying fluid and can, for instance, be used to provide electricity and drinking water using a steam generator, a turbo group and a condenser. Water that flows back out of the steam generator can initially be directed into a warm water recirculation heater in order to minimize heat loss. The thermal storage water heater is embedded in the warm water recirculation heater. Preferably, both storage devices are designed in such a way that their volumes can be modified.

21 Claims, 10 Drawing Sheets

INSTALLATION FOR PRODUCING SOLAR THERMAL ENERGY

The invention relates to an installation for producing solar thermal energy, having an absorber layer for conversion of sunlight into thermal energy and a transparent heat-carrying liquid for transporting the heat produced in said absorber layer for further use, said absorber layer being situated within said heat-carrying liquid.

Installations for producing solar thermal energy are known in various conformations. Examples include solar tower power plants or parabolic trough power plants, which make solar energy usable by thermal conversion on a commercial scale. However, such power plants have very large surface area requirements. In addition, the use of same is limited to latitudes where high direct solar radiation is assured, because they can make little use of the diffuse portion of the sunlight.

On a smaller scale, facilities for producing solar thermal energy are known in the form of solar collectors for residential water heating, said collectors preferably being installed on the roof. However, such a decentralized use of solar energy serves more to reduce residential energy costs than to replace fossil energy fuel as the primary energy source.

A floating solar power plant for the commercial-scale production of electricity is known from Patent DE 25 43 687 C2. The surfaces of said solar power plant are designed as absorbers and track the sun's path. Said absorbers are hereby mounted on a floating collector platform, designed as a circular plate of very large diameter, made from a flexible material designed to absorb tensile stress. Said floating collector platform is provided with devices that can turn the platform on the water.

Patent DE 28 19 946 A1 describes a thermal storage pond and an energy generating installation using same. Said thermal storage pond contains a thermal storage liquid that floats upon an insulating layer, said layer being thick enough to thermally insulate said thermal storage liquid. Said energy generating installation encompasses said thermal storage pond. In addition, a thermal engine is provided to extract heat from said thermal storage liquid.

A solar collector having an absorber situated within a transparent heat-carrying liquid is known from Utility Model DE 296 03 275 U1. This specialized arrangement of said absorber is intended to minimize heat loss from said absorber to said heat-carrying liquid during heat transfer, and in particular to avoid radiation loss from said absorber. However, the material costs for this known solar collector are relatively high, so that use is limited to residential water heating.

Proceeding from the prior art, the object of this invention is to provide an installation for producing solar thermal energy, using the aforementioned principle of the absorber arrangement, to make solar energy usable by thermal conversion on a commercial scale, without additional fuel firing. This objective is achieved by an installation having the features of accompanying claim 1.

Advantageous developments and further developments of the invention arise from claims 2–19.

The main element of the installation according to the invention is at least one thermal storage water heater wherein hot water at a temperature typically around 100° C. is produced from solar radiation and simultaneously stored, using an absorber layer on the inside thereof. Said thermal storage water heater is situated to float beneath a water surface. The installation according to the invention is thus set up in a body of water, preferably in an ocean, so that no land area is consumed. Solar radiation is directly converted to heat in the energy storage unit, thus eliminating energy loss during heat transport. Use of integrated energy storage removes the need for fossil fuels during the time when solar radiation is absent.

The thermal storage water heater is provided with thermal insulation to reduce heat loss to the surroundings. Said thermal insulation is transparent on the upper side of said thermal storage water heater to allow solar radiation to penetrate to the absorber layer.

Hot water can be removed from the thermal storage water heater as a heat-carrying liquid, with which electricity or drinking water can be produced without additional fuel firing at middle to base load conditions. Heat decoupling for supplying district heating, for example, is also possible.

One advantage of the invention is that the installation may be operated for producing solar thermal energy outside daylight hours, because sufficient energy can be stored at night and in times of low solar radiation by appropriate sizing of the thermal storage water heater. Depending on the size of the installation and the climate zone of the installation site, economic operation at middle to base load conditions is possible.

In contrast to known parabolic trough power plants, the installation according to the invention can use not only parallel solar radiation but also the diffuse portion thereof. Thus, said installation may be used even in tropical and moderate climate zones, thereby greatly increasing the areas of use.

The concept according to the invention, to transfer the heat generated in the absorber directly to the contents of the thermal storage water heater and to remove the heat-carrying liquid from said thermal storage water heater for further use, is particularly usable on a commercial scale due to the floating design of said thermal storage water heater. Said thermal storage water heater may be simply constructed in sizes that assure efficient energy storage.

A variable-volume design of the thermal storage water heater offers further advantages: depending on the intensity of solar radiation, the storage capacity can be modified. When the incident energy radiation is high, said thermal storage water heater can be enlarged by addition of colder water, thus eventually heating the colder water to the storage temperature with no loss of excess energy. When the installation is operated in the absence of solar radiation (at night), hot water is removed from said storage unit, thus decreasing the storage volume. Thus, colder water must not flow back into said thermal storage water heater, so that the storage temperature can remain unchanged at its high level, even during nighttime operation of said installation.

It is advantageous to provide the thermal storage water heater with membrane-like, movable walls. This not only conserves materials, but also avoids static difficulties and stability problems with the storage unit wall. Finally, in this manner water movements may be intercepted to a certain degree without risking damage to the storage unit walls.

Since most processes using the heat removed from the thermal storage water heater do not cool the hot water to ambient temperature, it is advantageous to provide a warm water recirculation heater for the returning heat-carrying liquid, said warm water recirculation heater being installed adjoining said thermal storage water heater. If the interface between the two said heaters is sufficiently large, heat loss from said thermal storage water heater to the surroundings is significantly reduced. Heat is transferred from said thermal storage water heater to said warm water recirculation heater more slowly due to the smaller temperature gradient, so that the heat flowing into said warm water recirculation heater is still not lost for the utilization process.

Preferably, the thermal storage water heater and the warm water recirculation heater can be designed as a module with common outer walls, whereby a movable partition separates the storage contents from one another. The movable design of said partition, which can be composed of thermal insulation, allows the volume of said thermal storage water heater and of said warm water recirculation heater to be modified, thus offering advantages depending on the solar radiation and the operating situation.

Such a partition designed as thermal insulation is preferably produced in a module as a single unit with the absorber layer, wherein the density of the entire structure is adjusted to be slightly greater than the density of the contents of the thermal storage water heater at the desired end temperature. Floating of said partition and said absorber layer is thus reliably prevented, thereby allowing said partition to be moved even by self-regulating means without outside intervention.

Reduction of heat loss from the thermal storage water heater is especially pronounced for thermal storage water heaters of a flat design, when said thermal storage water heater is embedded, at least at its upper and lower sides, into the warm water recirculation heater. Consequently, a portion of the incident solar energy absorbed approximately in the top-situated warm water recirculation heater is not lost for the utilization process, since said portion of incident solar energy additionally preheats the water before said water reaches said thermal storage water heater.

It can be advantageous if the portion of the warm water recirculation heater situated above the thermal storage water heater has the shape of a convex lens, thus allowing the parallel portion of the solar radiation to be concentrated in a specific region of said thermal storage water heater, wherein it is practical to arrange at that location a high-efficiency absorber.

Instead of or in addition to the design of the warm water recirculation heater as a convex lens, film panels may also be provided in the thermal storage water heater and preferably arranged in a parabolic shape at a particular region of said thermal storage water heater, thus concentrating the incident sunlight on this region.

In particular when the majority of the thermal storage water heater is embedded in the warm water recirculation heater, for the aforementioned reasons it is advisable that the former have membrane-like, movable walls.

The heat energy generated in the installation according to the invention and removed from the thermal storage water heater can be used advantageously for further purposes by (at least partially) evaporating in a steam generator the heat-carrying liquid removed from said thermal storage water heater. A condenser for condensing the steam can be installed following such a steam generator, wherein between said steam generator and said condenser is installed in a known manner a steam turbine having a generator for electric power generation. Drinking water may also be produced from the distillate of said condenser by means of a drinking water processing plant.

When the installation according to the invention is used in coastal regions, a seawater desalinization plant can be operated directly from the heat-carrying liquid removed from the thermal storage water heater. Advantageously, said seawater desalinization plant is installed in addition to electric power generation, and installed following the steam generator.

For mechanical protection of the installation according to the invention, in particular for use in the ocean, it is advantageous to cover said installation, or at least the thermal storage water heater, with a layer of surface water to provide protection from all types of wind effects. In particular, wave formation at the ocean surface during storms is then limited to the layer of surface water above said installation according to the invention, thus eliminating the danger of damage to said installation when said thermal storage water heater and optionally the warm water recirculation heater are equipped with membrane-like, movable walls. The transparent thermal insulation situated on the upper side of said thermal storage water heater is protected just as effectively.

For commercial-scale use of the invention, it is advisable to adjacently arrange a plurality of thermal storage water heaters of modular construction, and to connect same with a collecting line for removal of the heat-carrying liquid. In this regard it is particularly advantageous if said collecting line is designed as a steam generator so that process steam can be centrally removed from the installation of modular design.

For larger installations, a multipressure process can offer economic advantages. The seawater is hereby led to firther evaporation stages after leaving the first evaporation stage, thereby experiencing greater cooling than with the single-pressure process. In this manner, the enthalpy of the steam from said first stage, and thus the process efficiency can be increased.

Various embodiment examples of the invention are illustrated and described in more detail below by means of the attached drawings. Shown are the following:

Figure 1:
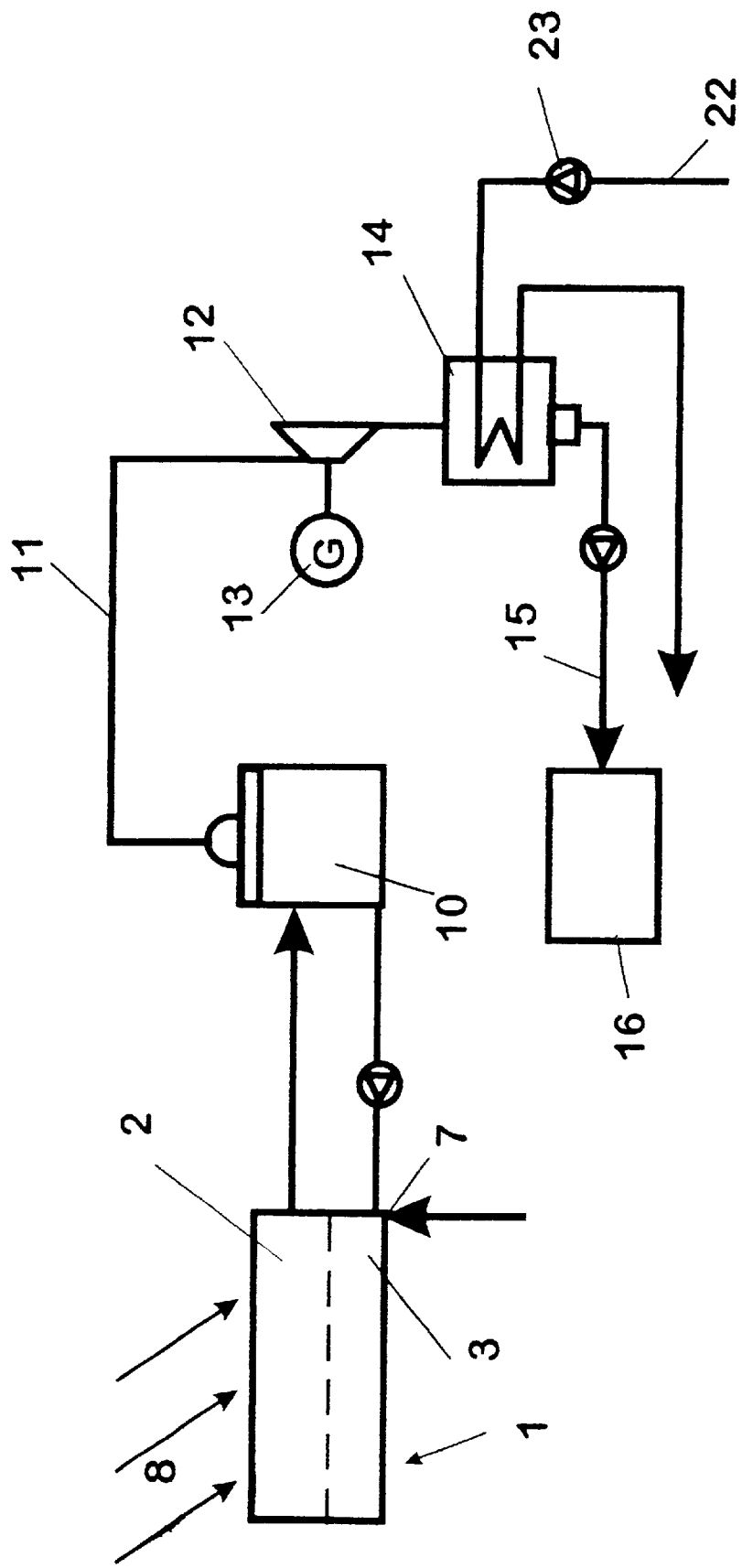
FIG. 1 shows a flow diagram of an installation according to the invention with an open circuit for producing electricity and distillate.

FIG. 1 shows a flow diagram of an installation for producing solar thermal energy, which produces electricity and drinking water in an open process. Solar radiation 8 striking a module 1 comprising a thermal storage water heater 2 and a warm water recirculation heater 3 is converted into heat in said thermal storage water heater 2, so that hot water of up to approximately 100° C. is contained therein as a heat-carrying liquid. Said hot water is removed from said thermal storage water heater 2 and led to a steam generator 10, where a portion of the hot water stream is evaporated as a result of the vacuum existing therein. The remaining, cooled water stream is returned to said warm water recirculation heater 3, where the quantity of water removed from the circuit as steam is replaced via a make-up water inlet 7. Said warm water recirculation heater 3 is joined to said thermal storage water heater 2 so that a circuit of said heat-carrying liquid is created.

The steam produced in the steam generator 10 is led via a steam line 11 to a condenser 14 and is condensed to form distillate 15. Cooling water from deep ocean levels is introduced into said condenser 14 by means of a cooling water suction line 22 and a cooling water pump 23. Said cooling water should be as cold as possible in order to achieve a high enthalpy gradient. Between said steam generator 10 and said condenser 14 is installed a steam turbine 12, which drives a generator 13 for producing electricity.

The distillate 15 produced in the condenser 14 is led to a drinking water processing plant 16 to produce purified water as a by-product of electric generation. The turbine and generator may be omitted if solely drinking water is to be produced. Where a plurality of installations are present, one of same could be provided with a steam turbine 12 and generator 13 to supply internal electrical needs.

Figure 2:
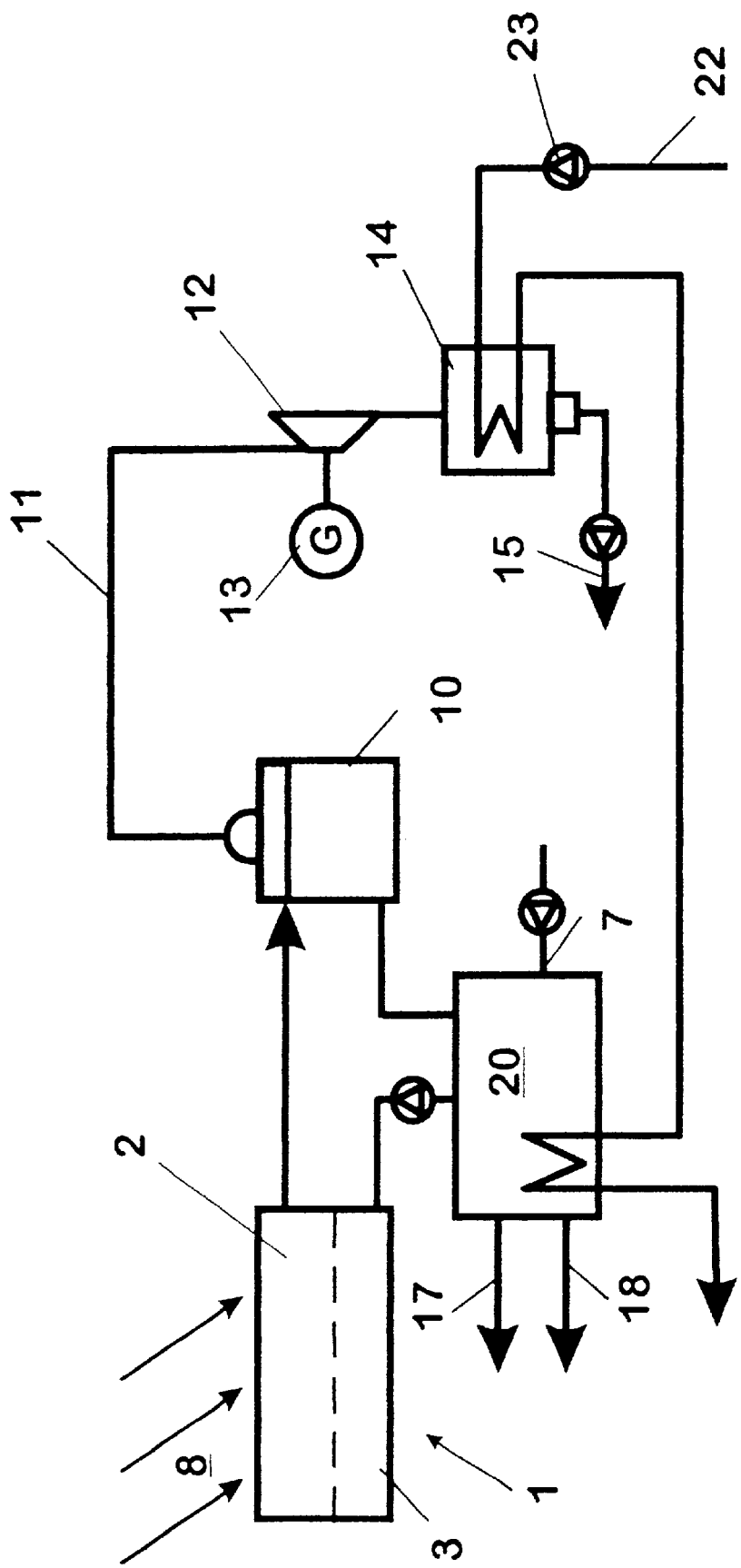
FIG. 2 shows a flow diagram of an installation according to FIG. 1, with a supplemental seawater desalinization plant.

The embodiment example shown in FIG. 2 differs from the installation shown in FIG. 1 in that a seawater desalinization plant 20 is additionally operated. Energy for operating said seawater desalinization plant 20 is taken from the warm water stream returning to the warm water recirculation heater 3 from the steam generator 10. Said seawater desalinization plant 20 separates seawater, supplied via a make-up water inlet 7, in a known manner into drinking water 17 and a concentrated salt solution 18. Cooling water required for this process is provided from the cold water from deep ocean levels, flowing back from the condenser 14.

Figure 3:
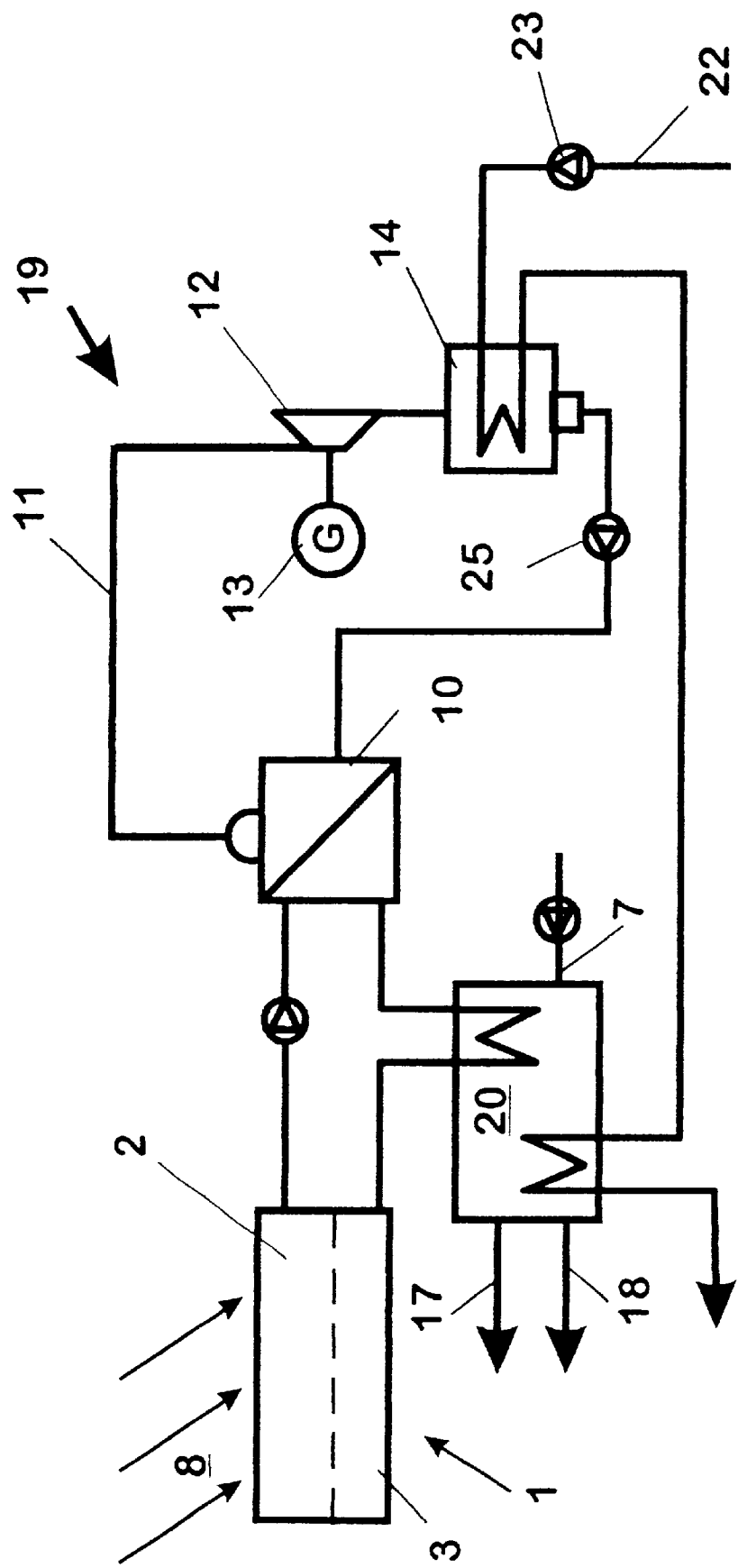
FIG. 3 shows a flow diagram of an installation according to the invention with closed circuits.

The embodiment example shown in FIG. 3 differs from the preceding embodiment examples in that a closed secondary circuit 19 containing deionized-quality water is provided. The steam generator 10 therefore operates with a heat exchanger whereby the primary circuit of heat-carrying liquid is also closed. The water condensed in the condenser 14 is returned via a feed water pump 25 to said steam generator 10. As a result, there is no distillate 15 here that could serve to produce drinking water. Said drinking water is produced solely by the seawater desalinization plant 20.

Figure 4:
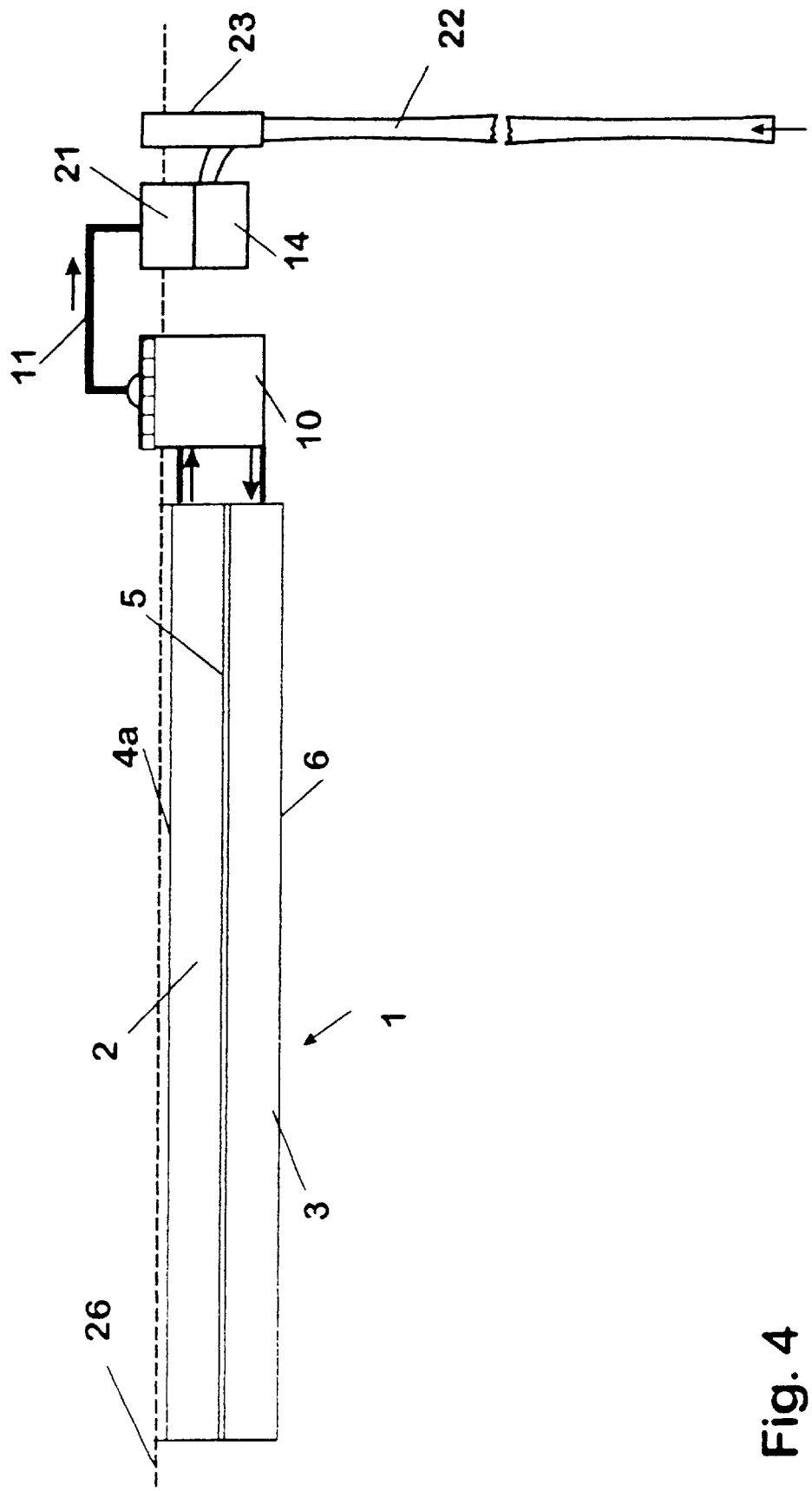
FIG. 4 shows a side view of an installation according to the invention with an open circuit for producing electricity and distillate.

FIG. 4 shows an embodiment example of the installation according to the invention in sectional representation. A large-surface thermal storage water heater 2, provided with an absorber layer 5, floats at the surface 26 of a body of water. The upper side of said thermal storage water heater 2 is provided with transparent thermal insulation 4a; to the underside of same is attached a warm water recirculation heater 3 whose wall 6 is likewise heat-insulated against the surrounding water. The hot water removed as heat-carrying liquid from said thermal storage water heater 2 is led to a steam generator 10, and from there flows back to said warm water recirculation heater 3. The steam produced in said steam generator 10 is directed via a steam line 11 to a turbo group 21 and from there into a condenser 14, which is supplied with the coldest possible water from deep ocean levels via a cooling water suction line 22 and a cooling water pump 23.

In this embodiment example, the module 1 having the thermal storage water heater 2, as well as the steam generator 10, turbo group 21, and condenser 14, are designed to float.

Figure 5:
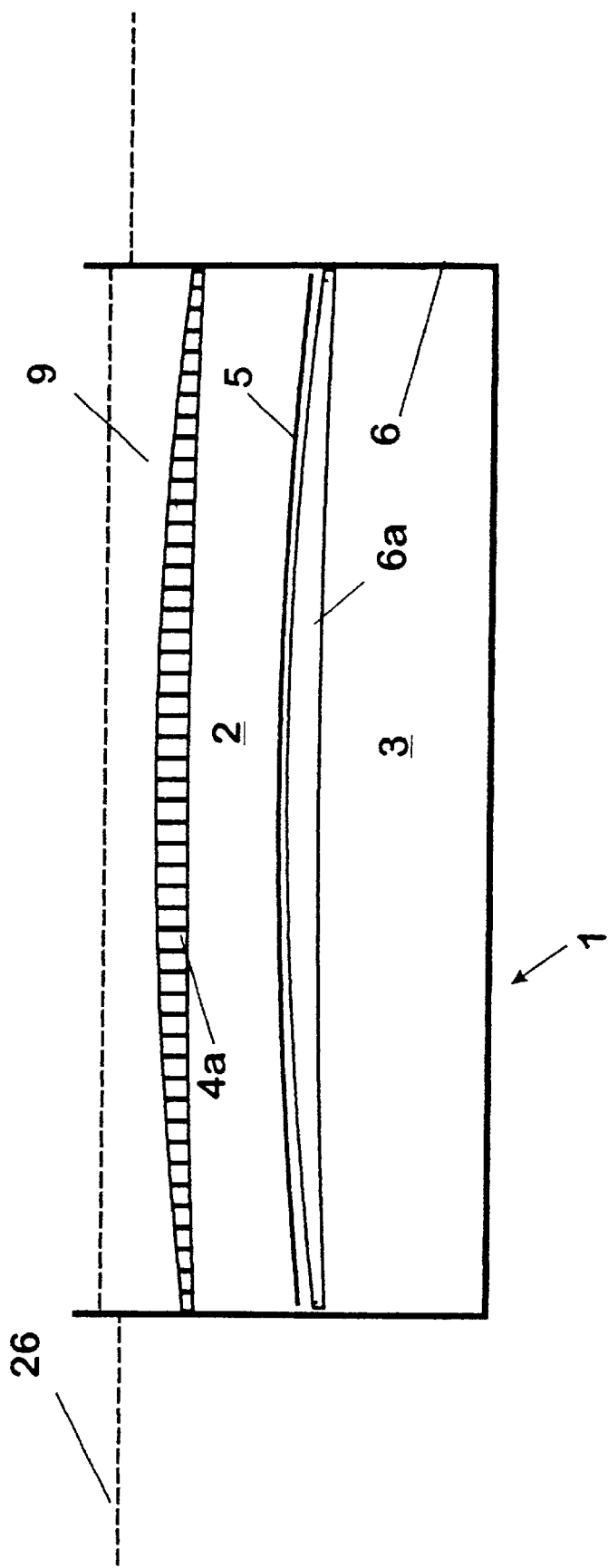
FIG. 5 shows a section through a thermal storage water heater with a warm water recirculation heater.

FIG. 5 shows a section through a module 1. The thermal storage water heater 2 with its transparent thermal insulation 4a situated on the upper side of same is covered with surface water 9. The absorber layer 5 is situated within said thermal storage water heater 2. Below said thermal storage water heater 2 is arranged the warm water recirculation heater 3, which is separated from said thermal storage water heater 2 by thermal insulation 6a. The wall 6 enclosing the entirety of said module 1 has a membrane-like, movable design.

Solar radiation 8 penetrates through the transparent thermal insulation 4a into the thermal storage water heater 2. The water absorbs a portion of said solar radiation 8 upon passage and is thereby slightly warmed. The remainder of said solar radiation 8 strikes the absorber layer 5 and heats same, which in turn heats the surrounding water to the desired maximum temperature. The maximum attainable steam pressure before evaporation is determined by the water pressure existing at the highest point of said thermal storage water heater 2.

When the maximum temperature of the thermal storage water heater 2 is attained, the absorber layer 5 and the thermal insulation 6a are moved downward. Water from the warm water recirculation heater 3 hereby reaches the surroundings of said absorber layer 5, thus being heated and supplementing the water, heated to the maximum temperature, in said thermal storage water heater 2. When hot water is removed from said thermal storage water heater 2 outside daylight hours, the thermal insulation 6a is again moved upward so that water cannot flow from said warm water recirculation heater 3 into said thermal storage water heater 2, and the temperature in said thermal storage water heater 2 remains constant. Said movable thermal insulation 6a thus allows the volumes of said thermal storage water heater 2 and said warm water recirculation heater 3 to be modified, which may become necessary depending on the incident solar radiation and the operational situation.

The module 1 shown in FIG. 6 corresponds essentially to that shown in FIG. 5, except that here the warm water recirculation heater 3 is divided to decrease heat loss, so that a portion of said warm water recirculation heater 3 is situated respectively above and below the thermal storage water heater 2. Between said warm water recirculation heater 3 and said thermal storage water heater 2 is arranged additional transparent thermal insulation 4b, through which solar radiation 8 can penetrate to the absorber layer 5.

Figure 6:
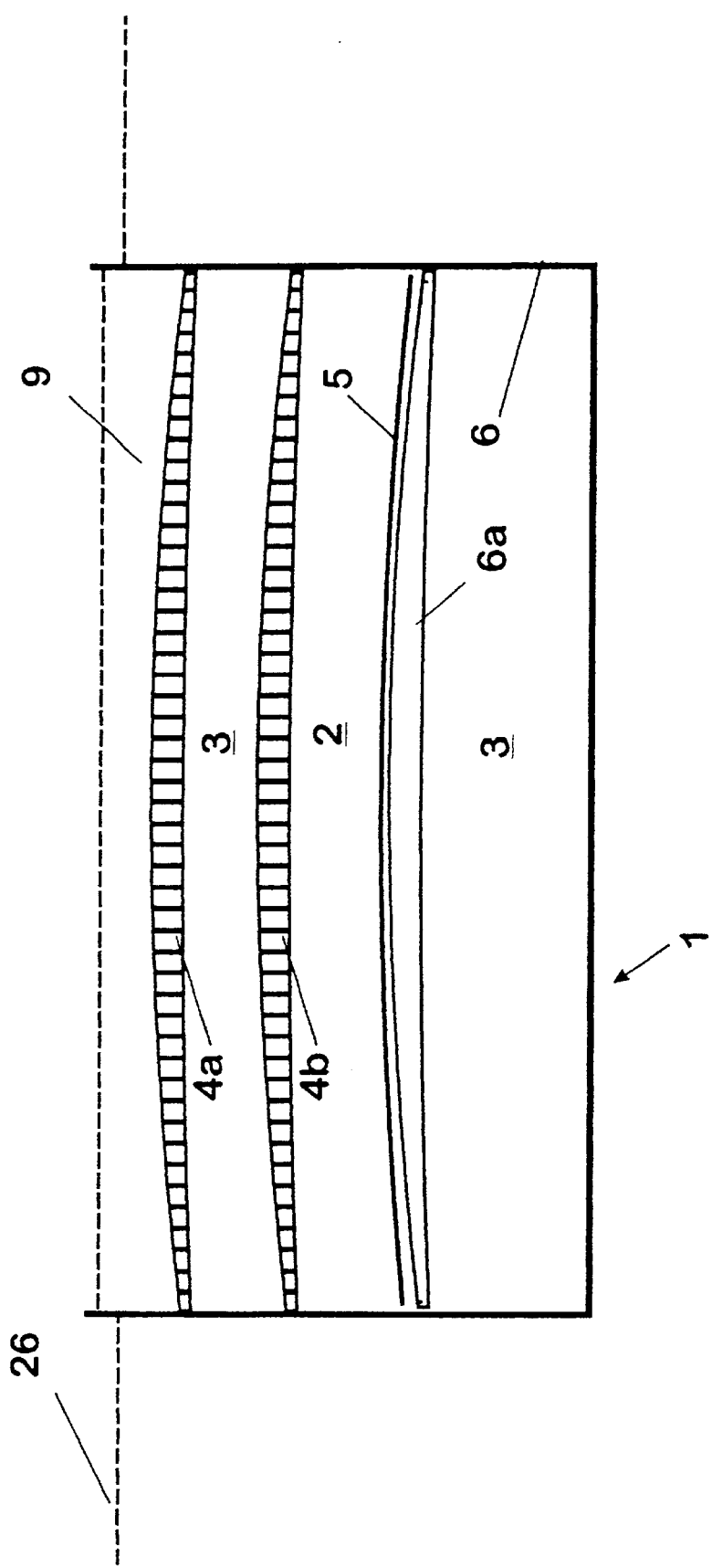
FIG. 6 shows a section through a thermal storage water heater with divided warm water recirculation heaters.
Figure 7:
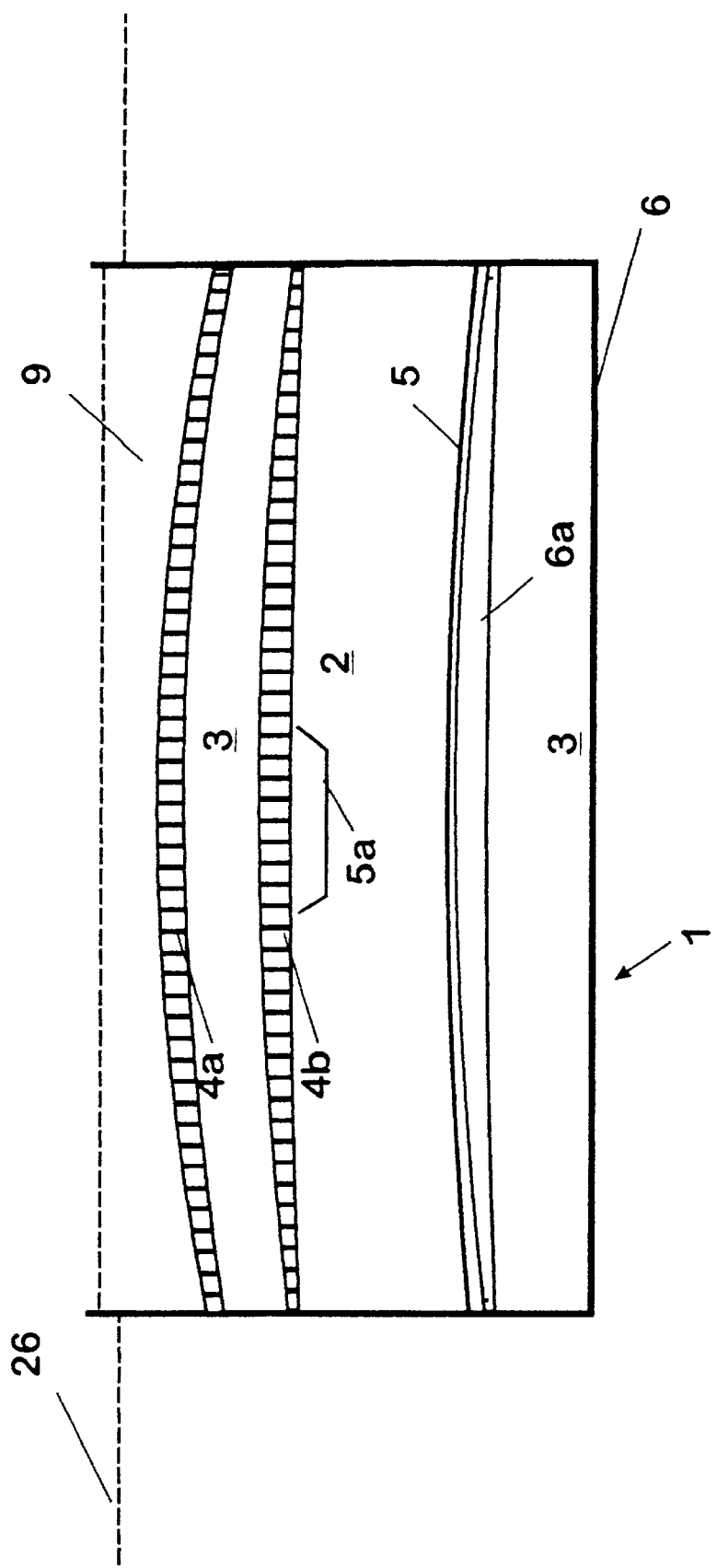
FIG. 7 shows a section through a thermal storage water heater with a lens-shaped upper warm water recirculation heater.

The design of the module 1 shown in FIG. 7 corresponds to that shown in FIG. 6, with the exception that the cross section of the upper portion of the warm water recirculation heater 3 has the shape of a convex lens. In the thermal storage water heater 2 is arranged an additional upper absorber 5a, upon which a majority of the incident solar radiation 8 is concentrated by the lens-shaped upper warm water recirculation heater 3. The portion of said entering solar radiation 8 not striking said upper absorber 5a is converted into heat by the absorber layer 5.

Figure 8:
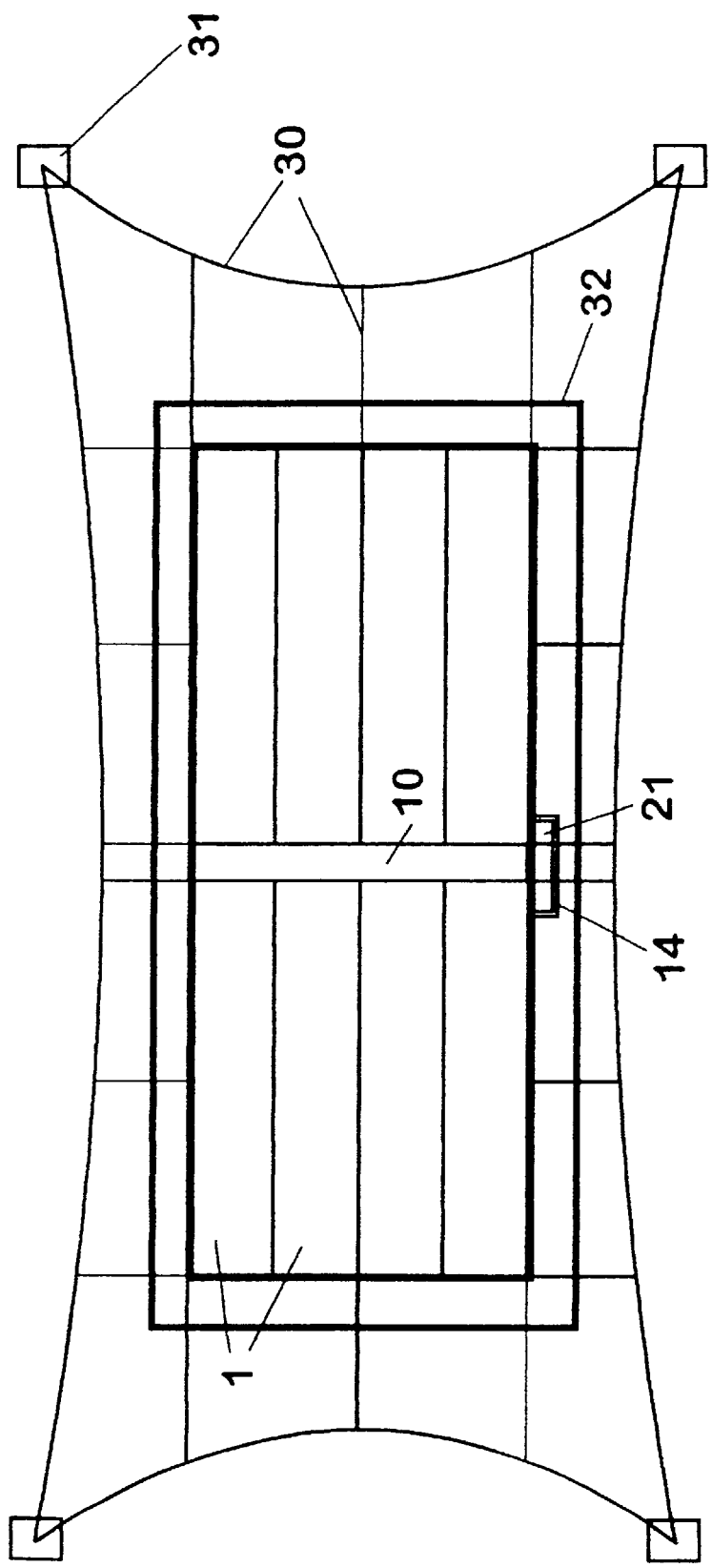
FIG. 8 shows a top view of an installation according to the invention assembled in modular construction.

FIG. 8 shows a top view of an installation according to the invention for use on a commercial scale. A plurality of modules 1 of flat design comprises thermal storage water heaters 2 that are adjacently arranged and adjoin a central collecting line for removal of heat-carrying liquid. Said collecting line is designed as a steam generator 10, thus making it unnecessary to have separate lines for the primary circuit. The steam produced in said steam generator 10 reaches the condenser 14 via a laterally arranged turbo group 21.

The entire installation shown here can preferably be placed in the ocean. Mechanical protection of the modules 1 is provided by encircling same by wave protection 32. Said modules are connected to anchors 31 by means of tension ropes 30, but at the same time are provided with membrane-like, movable walls so that the entire installation can accommodate slight water movement.

Figure 9:
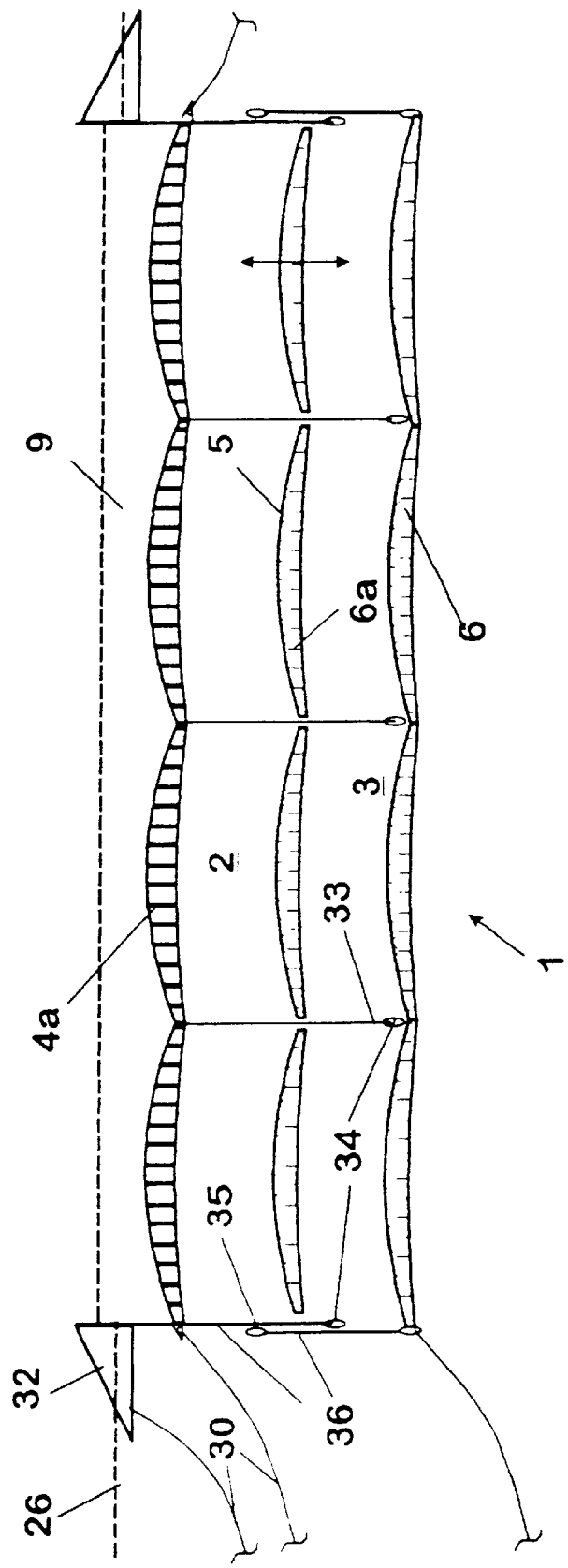
FIG. 9 shows a section through the installation as shown in FIG. 8.

FIG. 9 shows in a sectional view the installation from FIG. 8, wherein four adjacently disposed modules 1 can be seen. Each of said modules comprises a thermal storage water heater 2, a warm water recirculation heater 3 situated thereunder, thermal insulation 6a lying therebetween upon which the absorber layer 5 is attached, and transparent thermal insulation 4a situated on top and covered with surface water 9. The wall 6, which separates said warm water recirculation heater 3 from the surrounding water, is likewise provided with thermal insulation.

In order to counteract the buoyancy of the transparent thermal insulation 4a, same is provided with tension weights 34, which in the simplest case can be sand-filled tubes, wherein said tension weights 34 stretch filmlike partitions 33 to separate the individual modules 1. The tension ropes 30 hold the installation in place and provide pretensioning of said transparent thermal insulation 4a, wherein the wave protection 32 prevents mechanical damage to the installation during storms.

The membrane-like outer wall 36 of the illustrated installation has a two-part design, with tension being held on the lower part by buoyancy bodies 35 and on the upper part by tension weights 34. This two-part design of said outer wall 36 allows the overall volume within individual modules 1 to be modified, wherein also the thermal insulation 6a between the thermal storage water heaters 2 and the warm water recirculation heaters 3 has a movable design, so that said thermal storage water heaters 2 and said warm water recirculation heaters 3 can be reduced or enlarged independently of one another, depending on solar radiation and removed available heat.

Figure 10:
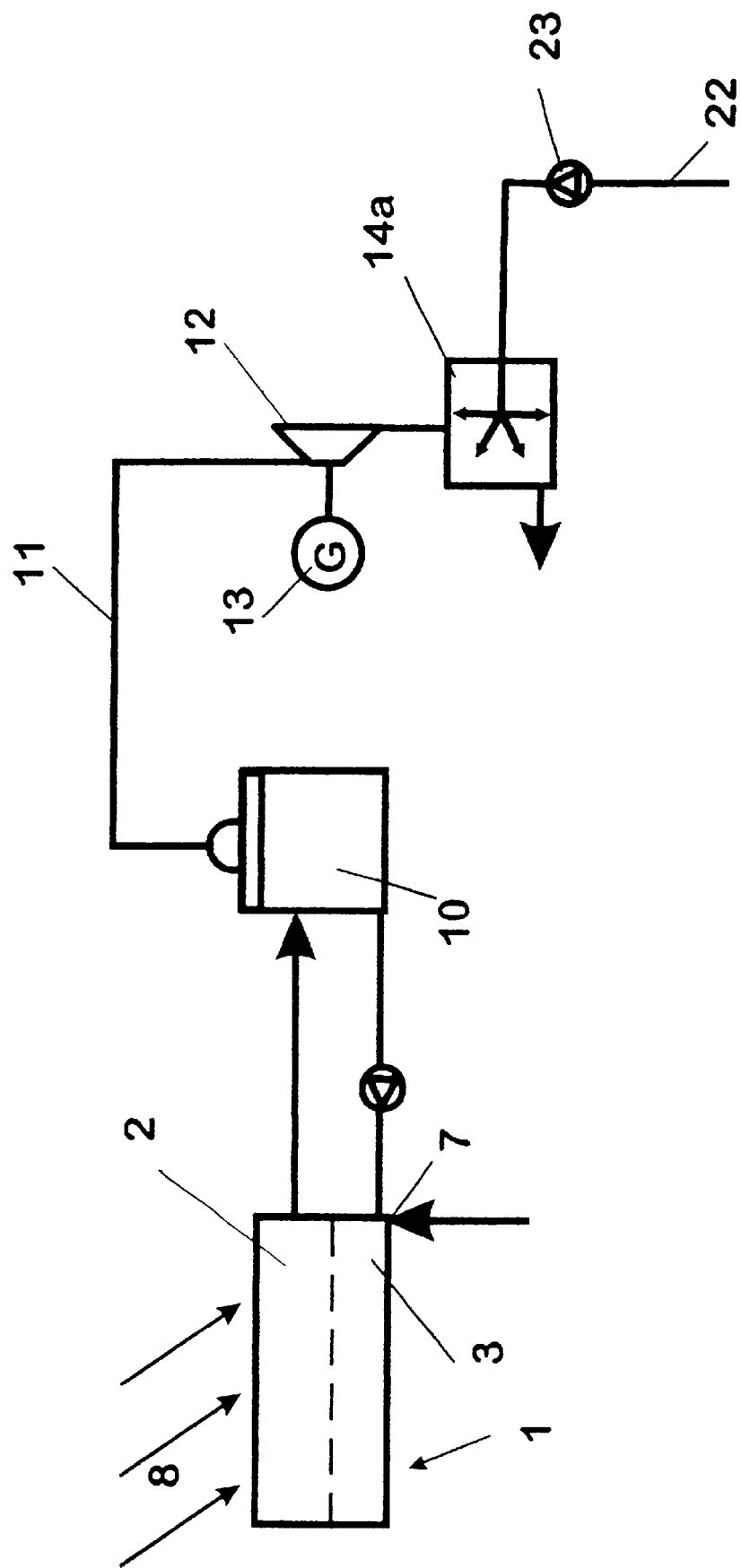
FIG. 10 shows a flow diagram of an installation according to the invention according to a further embodiment example.

Finally, FIG. 10 shows once again a flow diagram of an installation according to the invention, having an open circuit for producing electricity. Said installation differs from that shown in FIG. 1 in that no distillate 15 is produced in the condenser 14, but rather said condenser 14 is designed as an injection condenser 14a that allows more efficient cooling of the steam, so that the enthalpy gradient and thus the efficiency of said installation is proved.

LIST OF REFERENCE NOTATIONS

1 Module
2 Thermal storage water heater
3 Warm water recirculation heater
4a 4b Transparent thermal insulation
5 Absorber layer
5a Upper absorber
6 Wall
6a Thermal insulation
7 Make-up water inlet
8 Solar radiation
9 Surface water
10 Steam generator
11 Steam line
12 Steam turbine
13 Generator
14 Condenser
14a Injection condenser
15 Distillate
16 Drinking water processing plant
17 Drinking water
18 Concentrated salt solution
19 Secondary circuit
20 Seawater desalinization plant
21 Turbo group
22 Cooling water suction line
23 Cooling water pump
25 Feed water pump
26 Surface
30 Tension rope
31 Anchor
32 Wave protection
33 Partition
34 Tension weight
35 Buoyancy body
36 Outer wall

What is claimed is:

1. An installation for producing solar thermal energy, having an absorber layer for conversion of sunlight into thermal energy, and a transparent heat-carrying liquid for transporting the heat produced in said absorber layer for further use, said absorber layer being situated within said heat-carrying liquid, characterized in that said absorber layer is arranged within a thermal storage water heater that serves to store thermal energy released from said absorber layer, and from which hot water may be removed as a heat-carrying liquid, whereby said thermal storage water heater is operable to float beneath the surface of a body of water and is provided at least on the upper side of same with transparent thermal insulation.

2. An installation according to claim 1, characterized in that:
said thermal storage water heater has a variable-volume design.

3. An installation according to claim 2, characterized in that:
said thermal storage water heater has membrane-like, movable walls.

4. An installation according to claim 1, characterized in that:
a warm water recirculation heater is provided to accept said heat-carrying liquid that is removed from said thermal storage water heater, cooled by a recovery process, and returned to said thermal storage water heater, and said warm water recirculation heater is disposed adjacently to said thermal storage water heater.

5. An installation according to claim 4, characterized in that:
said thermal storage water heater and said warm water recirculation heater are combined into a module having common outer walls, wherein a movable partition is provided between said thermal storage water heater and said warm water recirculation heater.

6. An installation according to claim 5, characterized in that:
said movable partition is provided with thermal insulation.

7. An installation according to claim 6, characterized in that:
said absorber layer and said thermal insulation form a unit whose density is adjusted to be slightly greater than the density of the contents of said thermal storage water heater at a desired end temperature.

8. An installation according to claim 4, characterized in that:
said thermal storage water heater is embedded at least on its upper and lower sides into said warm water recirculation heater.

9. An installation according to claim 8, characterized in that:

the portion of the warm water recirculation heater arranged above the thermal storage water heater has a lens-shape to concentrate incident solar radiation upon an upper absorber arranged in said thermal storage water heater.

10. An installation according to claim 1, characterized in that:

film reflectors are provided in said thermal storage water heater to concentrate incident solar radiation upon an upper absorber arranged in said thermal storage water heater.

11. An installation according to claim 4, characterized in that:

said warm water recirculation heater has membrane-like, movable walls.

12. An installation according to claim 1, characterized in that:

a steam generator is provided to at least partially evaporate the heat-carrying liquid removed from said thermal storage water heater.

13. An installation according to claim 12, charaterized in that:

said installation includes a steam turbine connected to said steam generator and to said generator to produce electricity, and to a condenser to condense steam.

14. An installation according to claim 13, characterized in that:

a drinking water processing plant is provided to produce drinking water from distillate from said condenser.

15. An installation according to claim 1, characterized in that:

a seawater desalinization plant is provided and is operable with said heat-carrying liquid removed from said thermal storage water heater.

16. An installation according to claim 15, characterized in that:

said seawater desalinization plant is installed following a steam generator.

17. An installation according to claim 1, characterized in that:

said installation is covered with a layer of surface water of said body of water that provides protection from wind effects.

18. An installation according to claim 1, characterized in that:

a plurality of thermal storage water heaters of modular construction are disposed adjacently and connected to one another by a collecting line for removal of heat-carrying liquid.

19. An installation according to claim 18, characterized in that:

said collecting line comprises a steam generator.

20. An installation for producing solar thermal energy, having an absorber layer for conversion of sunlight into thermal energy, and a transparent heat-carrying liquid for transporting the heat produced in said absorber layer for further use, said absorber layer being situated within said heat-carrying liquid, characterized in that said absorber layer is arranged within a variable volume thermal storage water heater including movable walls and that serves to store thermal energy released from said absorber layer, and from which hot water may be removed as a heat-carrying liquid, whereby said thermal storage water heater is operable to float in a body of water and is provided at least on its upper side with transparent thermal insulation, and a warm water recirculation heater is provided to accept heat-carrying liquid removed from said thermal storage water heater, cooled by a recovery process, and returned to said thermal storage water heater, and said warm water recirculation heater is disposed adjacent to said thermal storage water heater.

21. An installation for producing solar thermal energy, having an absorber layer for conversion of sunlight into thermal energy, and a transparent heat-carrying liquid for transporting the heat produced in said absorber layer for further use, said absorber layer being situated within said heat-carrying liquid, characterized in that said absorber layer is arranged within a thermal storage water heater that serves to store thermal energy released from said absorber layer, and from which hot water may be removed as a heat-carrying liquid, said thermal storage water heater is operable to float on a body of water and is provided at least on its upper side with transparent thermal insulation and said thermal storage water heater is embedded at least on its upper and lower sides into a warm water recirculation heater, said warm water recirculation heater accepting heat carrying liquid removed from said thermal storage water heater and subjected to a heat recovery process.

* * * * *